US012389304B2

(12) United States Patent
Tumuluru

(10) Patent No.: US 12,389,304 B2
(45) Date of Patent: Aug. 12, 2025

(54) CLIENT STEERING BASED ON CLIENT BATTERY LEVEL

(71) Applicant: ARRIS Enterprises LLC, Suwanee, GA (US)

(72) Inventor: Sundar Murthy Tumuluru, Bangalore (IN)

(73) Assignee: ARRIS ENTERPRISES LLC, Horsham, PA (US)

(*) Notice: Subject to any disclaimer, the term of this patent is extended or adjusted under 35 U.S.C. 154(b) by 347 days.

(21) Appl. No.: 17/903,304

(22) Filed: Sep. 6, 2022

(65) Prior Publication Data

US 2023/0085989 A1  Mar. 23, 2023

Related U.S. Application Data

(60) Provisional application No. 63/246,019, filed on Sep. 20, 2021.

(51) Int. Cl.
*H04W 40/10* (2009.01)
*H04W 72/51* (2023.01)

(52) U.S. Cl.
CPC ........... *H04W 40/10* (2013.01); *H04W 72/51* (2023.01)

(58) Field of Classification Search
CPC ... H04W 40/10; H04W 72/51; H04W 36/165; H04W 36/008375; Y02D 30/70
See application file for complete search history.

(56) References Cited

U.S. PATENT DOCUMENTS

| 11,388,727 | B1* | 7/2022 | Argenti | H04W 40/02 |
| 11,558,815 | B2* | 1/2023 | Wang | H04W 52/0206 |
| 2018/0192329 | A1* | 7/2018 | Medapalli | H04W 74/0833 |
| 2019/0306866 | A1* | 10/2019 | Agrawal | H04W 8/22 |
| 2022/0053501 | A1* | 2/2022 | Jia | H04W 72/542 |
| 2022/0303085 | A1* | 9/2022 | Chen | H04W 72/046 |
| 2022/0400530 | A1* | 12/2022 | Wheelock | H04W 74/002 |
| 2022/0417937 | A1* | 12/2022 | Argenti | H04W 40/02 |

* cited by examiner

*Primary Examiner* — Abdullahi Ahmed
(74) *Attorney, Agent, or Firm* — Wenderoth, Lind & Ponack, L.L.P.

(57) ABSTRACT

A network controller device for use with a first and second radio, and a client device, the first and second radio being configured to communicate with the network controller device and the client device on a first and second band. The network controller device includes: a memory of a priori history data; and a processor configured to execute the instructions stored in the memory to cause the network controller device to: determine the current battery level of the client device while wirelessly communicating on the first band; obtain the a priori history data; determine a battery level required to complete a service on the first band based on the a priori history data; and steer the client device to the second band when the determined battery level required to complete the service on the first band based on the a priori history data is less than the current battery level.

15 Claims, 4 Drawing Sheets

CLIENT STEERING BASED ON CLIENT BATTERY LEVEL

BACKGROUND

Embodiments of the invention relate to client steering based on the client battery level in a wireless network.

SUMMARY

Aspects of the present invention are drawn to a network controller device for use with a first radio, a second radio, and a client device, the first radio being configured to wirelessly communicate with the network controller device and the client device on a first band, the second radio being configured to wirelessly communicate with the network controller device and the client device on a second band, the client device having a current battery level and being configured to communicate the value of the battery level to the network controller device, the network controller device including: a memory having instructions and a priori history data stored therein, the a priori history data corresponding to previous operations of the client device; and a processor configured to execute the instructions stored in the memory to cause the network controller device to: determine the current battery level of the client device while wirelessly communicating on the first band; obtain the a priori history data from the memory; determine a battery level required to complete a service on the first band based on the a priori history data; and steer the client device to the second band when the determined battery level required to complete the service on the first band based on the a priori history data is less than the current battery level.

In some embodiments, the processor is configured to execute instructions stored on the memory to additionally cause the network controller device to determine a second battery level required to complete the service on the second band based on the a priori history data.

In some further embodiments, the processor is configured to execute instructions stored on the memory to additionally cause the network controller device to provide a battery level notification to the client device when the determined second battery level required to complete the service on the second band based on the a priori history data is less than the current battery level.

In some further embodiments, the processor is configured for further use with a third radio being configured to wirelessly communicate with the network controller device and the client device on a third band, wherein the processor is configured to execute instructions stored on the memory to additionally cause the network controller device to steer the client device to the third band when the determined battery level required to complete the service on the second band based on the a priori history data is less than the current battery level.

Other aspects of the present disclosure are drawn to a method of using a network controller device with a first radio, a second radio, and a client device, the first radio being configured to wirelessly communicate with the network controller device and the client device on a first band, the second radio being configured to wirelessly communicate with the network controller device and the client device on a second band, the client device having a current battery level and being configured to communicate the value of the battery level to the network controller device, the method including: storing, via a processor configured to execute instructions stored on a memory, a priori history data into the memory, the a priori history data corresponding to previous operations of the client device; determining, via the processor, the current battery level of the client device while wirelessly communicating on the first band; obtaining, via the processor, the a priori history data from the memory; determining, via the processor, a battery level required to complete a service on the first band based on the a priori history data; and steering, via the processor, the client device to the second band when the determined battery level required to complete the service on the first band based on the a priori history data is less than the current battery level.

In some embodiments, the method further includes determining, via the processor, a second battery level required to complete the service on the second band based on the a priori history data.

In some further embodiments, the method further includes providing, via the processor, a battery level notification to the client device when the determined second battery level required to complete the service on the second band based on the a priori history data is less than the current battery level.

In some further embodiments, the method is for further use with a third radio being configured to wirelessly communicate with the network controller device and the client device on a third band, the method further including steering, via the processor, the client device to the third band when the determined battery level required to complete the service on the second band based on the a priori history data is less than the current battery level.

Other aspects of the present disclosure are drawn to a non-transitory, computer-readable media having computer-readable instructions stored thereon, the computer-readable instructions being capable of being read by a network controller device for use with a first radio, a second radio, and a client device, the first radio being configured to wirelessly communicate with the network controller device and the client device on a first band, the second radio being configured to wirelessly communicate with the network controller device and the client device on a second band, the client device having a current battery level and being configured to communicate the value of the battery level to the network controller device, wherein the computer-readable instructions are capable of instructing the network controller device to perform the method including: storing, via a processor configured to execute instructions stored on a memory, a priori history data into the memory, the a priori history data corresponding to previous operations of the client device; determining, via the processor, the current battery level of the client device while wirelessly communicating on the first band; obtaining, via the processor, the a priori history data from the memory; determining, via the processor, a battery level required to complete a service on the first band based on the a priori history data; and steering, via the processor, the client device to the second band when the determined battery level required to complete the service on the first band based on the a priori history data is less than the current battery level.

In some embodiments, the computer-readable instructions are capable of instructing the network controller device to perform the method further including determining, via the processor, a second battery level required to complete the service on the second band based on the a priori history data.

In some further embodiments, the computer-readable instructions are capable of instructing the network controller device to perform the method further including providing, via the processor, a battery level notification to the client device when the determined second battery level required to complete the service on the second band based on the a priori history data is less than the current battery level.

In some further embodiments, the computer-readable media is configured for further use with a third radio being configured to wirelessly communicate with the network controller device and the client device on a third band, wherein the computer-readable instructions are capable of instructing the network controller device to perform the method further including steering, via the processor, the client device to the third band when the determined battery level required to complete the service on the second band based on the a priori history data is less than the current battery level.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

Client devices in home networks are configured to connect to a multitude of radio bands, non-limiting examples of which include 2.4 GHz, 5 GHz, or 6 GHz. 6 GHz and 5 GHz enable more data than the 2.4 GHz band, but they also have a smaller range. When the received signal strength indication (RSSI) is low, the radio of the connected device will use more power. As the range gets lower in the 6 GHz and 5 GHz bands, the RSSI will decrease faster than when connected to the 2.4 GHz band. Overall, when connected to the 2.4 GHz band, power consumption of the connected device is lower than when connected to the 5 GHz or 6 GHz band. In some instances, when users are operating their client devices, it may be more efficient to connect the client devices to the 2.4 GHz band in order to maintain their battery. However, when connected to the 5 GHz or 6 GHz band, the client devices are required to consume more battery power to complete the current task. There is a need for client devices to automatically steer to the most optimal bandwidth to ensure quality service without sacrificing battery power.

What is needed is a system and method for steering client devices based on battery level.

A system and method in accordance with the present disclosure steers client devices based on battery level.

In accordance with the present disclosure, a router is used within a home network. The router will obtain data from a connected client device and store it in a history database; non-limiting examples of data being RSSI, client device idle time and duration, etc. The router will analyze the history database in order to predict upcoming events for which the client device will be used. The router will determine what battery level is required for upcoming events to be completed on all bandwidths. The router will then steer the client device to the optimal bandwidth.

An example system and method for steering client devices based on battery level in accordance with aspects of the present disclosure will now be described in greater detail with reference to FIGS. 1-4.

Figure 1:
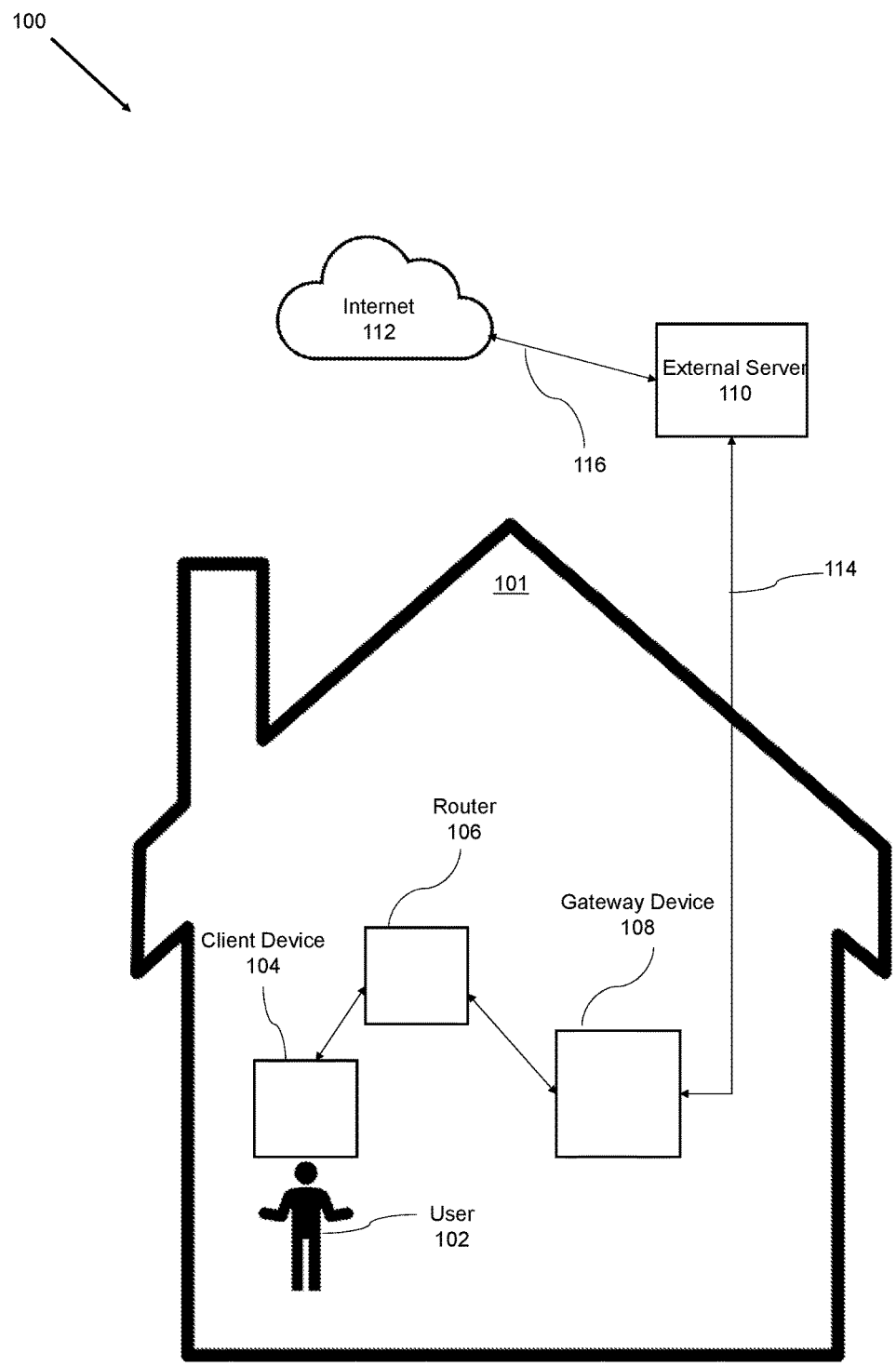
FIG. 1 illustrates a communication system in accordance with aspects of the present disclosure.

FIG. 1 illustrates a communication system 100 in accordance with aspects of the present disclosure.

As shown in FIG. 1, communication system 100 includes a residence 101, a user 102, a client device 104, a router 106, a gateway device 108, an external server 110, an Internet 112, and communication channels 114 and 116.

Gateway device 108, or CM, is an electronic device that is to be located so as to establish a local area network (LAN) at a consumer premises. The consumer premises can include a residential dwelling, an office, or any other business space of a user, such as residence 101. The terms home, office, and premises may be used synonymously herein.

Gateway device 108 may perform such functions as Web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Further, it should be noted that gateway device 108 is able to communicate with external server 110 via communication channels 114 and 116, which may optionally be a wireless communication system, such as 4G, or 5G, and further is able to connect to Internet 112.

Gateway device 108 serves as a gateway or access point to Internet 112 for one or more electronic devices, referred to generally herein as client device 104 that wirelessly communicates with gateway device 108 via, e.g., Wi-Fi. Client device 104 can be a desk top computer, laptop computer, electronic tablet device, smart phone, appliance, or any other so called Internet of things equipped devices that are equipped to communicate information.

A wireless access point (WAP), or more generally known as an access point (AP), is a networking hardware device that allows other Wi-Fi devices to connect to a Wi-Fi network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English. In residence 101, gateway device 108 and router 106 are access points.

Figure 2:
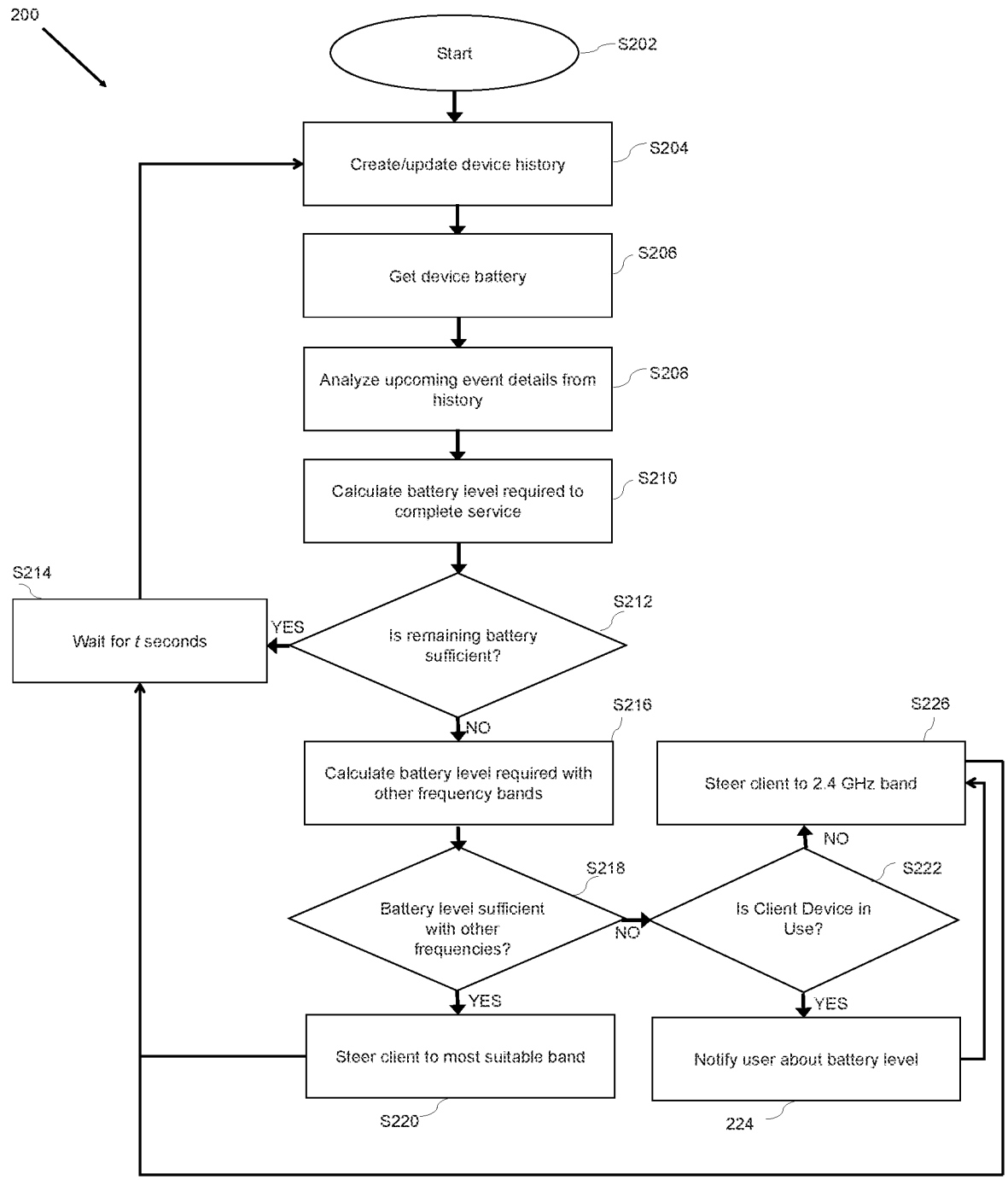
FIG. 2 illustrates an algorithm for steering a client device based on the battery level in accordance with aspects of the present disclosure.

FIG. 2 illustrates an algorithm 200 to be executed by a processor for steering a client device based on the battery level in accordance with aspects of the present disclosure.

As shown in FIG. 2, algorithm 200 starts (S202) and the client device history is created (S204). This will be described in greater detail with reference to FIG. 3.

Figure 3:
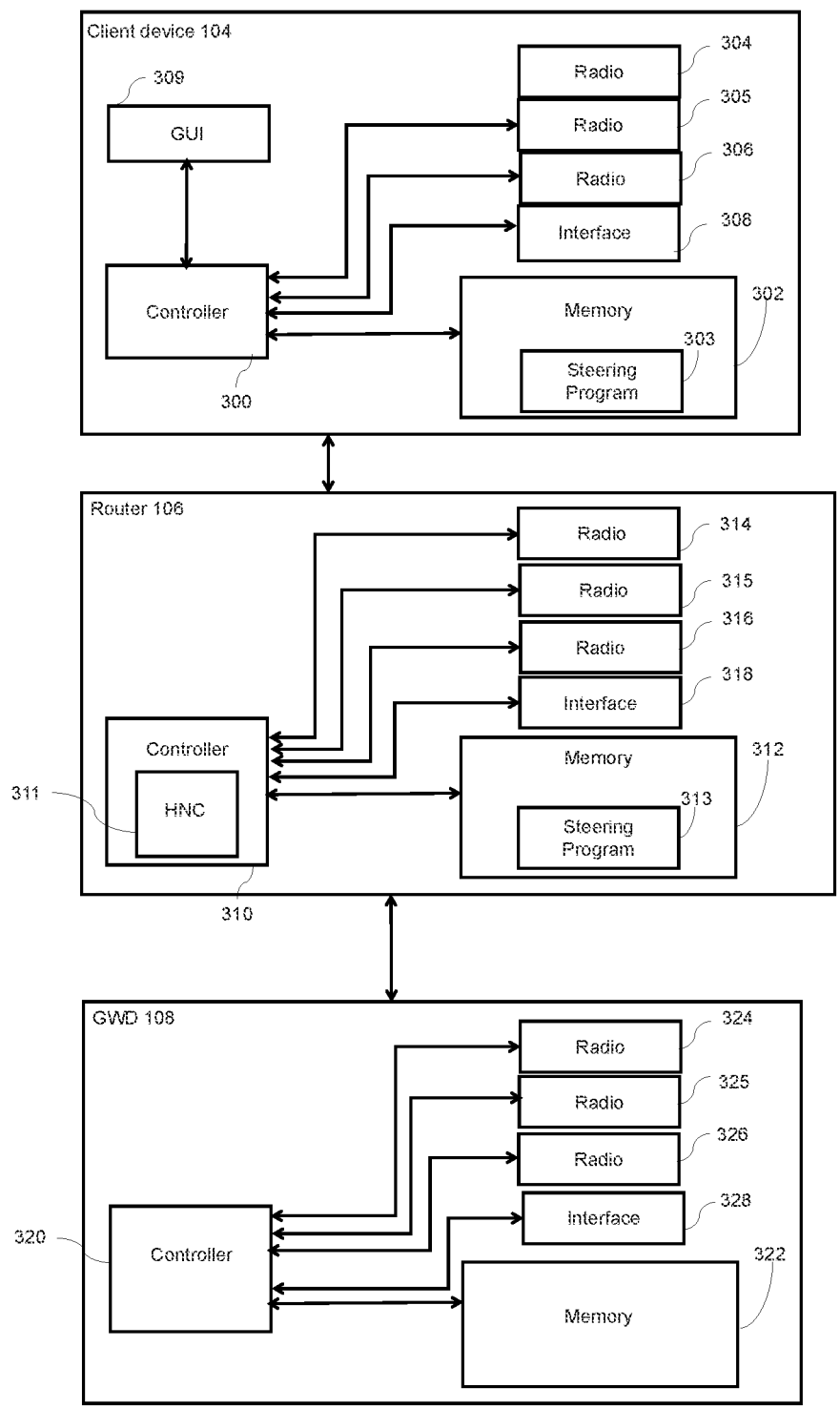
FIG. 3 illustrates an exploded view of a client device, a router, and a gateway device in accordance with aspects of the present disclosure.

FIG. 3 illustrates an exploded view of client device 104, router 106, and gateway device 108 in accordance with aspects of the present disclosure.

As shown in FIG. 3, client device 104 includes a controller 300; a memory 302, which has stored therein a steering program 303; and at least one radio, a sample of which is illustrated as a radio 304, a radio 305, and a radio 306; an interface 308; and a graphic user interface (GUI) 309.

In this example, controller 300, memory 302, radio 304, radio 305, and radio 306, interface 308 and GUI 309 are illustrated as individual devices. However, in some embodiments, at least two of controller 300, memory 302, radio 304, radio 305, and radio 306, interface 308 and GUI 309 may be combined as a unitary device. Further, in some embodiments, at least one of controller 300 and memory 302 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 300 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 104 in accordance with the embodiments described in the present disclosure.

Memory 302 can store various programming, and user content, and data, including steering program 303.

Steering program 303 provides the battery level of client device 104 to router 106 and displays a notification message to user 102 about the battery level. In some embodiments, home network controller (HNC) 311 of router 106 may request the battery level of client device 104.

Radios 304, 305, and 306 may include a Wi-Fi WLAN interface radio transceiver that is operable to communicate with router 106, as shown in FIG. 1, and also may include a cellular transceiver operable to communicate with a cellular network. Radios 304, 305, and 306 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Client device 104 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

In this non-limiting example embodiment, radio 304 will operate in the 2.4 GHz band, radio 305 will operate in the 5 GHz band, and radio 306 will operate the 6 GHz band. All of the 2.4 GHz band, the 5 GHz band, and the 6 GHz band are non-limiting examples of bandwidths to be used in accordance with the present disclosure.

Interface 308 can include one or more connectors, such as RF connectors, or Ethernet connectors, and/or wireless communication circuitry, such as 5G circuitry and one or more antennas.

GUI 309 may be any known device or system to display an interactive image to enable user 102 to interact with client device 104.

As shown in FIG. 3, router 106 includes a controller 310; a home network controller (HNC) 311; a memory 312, which has stored therein a steering program 313; at least one radio, a sample of which is illustrated as a radio 314, a radio 315, and a radio 316; and an interface 318.

In this example, controller 310, memory 312, radio 314, radio 315, radio 316 and interface 318 are illustrated as individual devices. However, in some embodiments, at least two of controller 310, memory 312, radio 314, radio 315, radio 316 and interface 318 may be combined as a unitary device. Further, in some embodiments, at least one of controller 310 and memory 312 may be implemented as a computer having tangible computer-readable media for carrying or having computer-executable instructions or data structures stored thereon.

Controller 310 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of router 106 in accordance with the embodiments described in the present disclosure.

HNC 311 controls router 106 within the wireless network. HNC 311 may perform tasks such as steering connected devices, a non-limiting example of which is a cell phone, from one access point to another.

In some embodiments, the HNC would be within gateway device 108.

Memory 312, as will be described in greater detail below, has instructions, including steering program 313, stored therein to be executed by controller 310 to allow router 106 to: determine the current battery level of client device 104 while wirelessly communicating on a first band; obtain a priori history data from memory 312; determine a battery level required to complete a service on the first band based on the a priori history data; and steer client device 104 to a second band when the determined battery level required to complete the service on the first band based on the a priori history data is less than the current battery level.

In some embodiments, memory 312, as will be described in greater detail below, has instructions within steering program 313 to be executed by controller 310 to allow router 106 to determine a second battery level required to complete the service on the second band based on the a priori history data.

In some further embodiments, memory 312, as will be described in greater detail below, has instructions within steering program 313 to be executed by controller 310 to allow router 106 to provide a battery level notification to client device 104 when the determined second battery level required to complete the service on the second band based on the a priori history data is less than the current battery level.

In some further embodiments, memory 312, as will be described in greater detail below, has instructions within steering program 313 to be executed by controller 310 to allow router 106 to steer client device 104 to a third band when the determined battery level required to complete the service on the second band based on the a priori history data is less than the current battery level.

In some further embodiments, memory 312, as will be described in greater detail below, has instructions within steering program 313 to be executed by controller 310 to allow router 106 to steer client device 104 to a less power consuming radio band during idle time. In some of these embodiments, memory 312, as will be described in greater detail below, has instructions within steering program 313 to be executed by controller 310 to allow router 106 to predict the idle time using the a priori history data.

Radios 314, 315, and 316, may include a Wi-Fi WLAN interface radio transceiver that is operable to communicate with client device 104 and gateway device 108, as shown in FIG. 1. Radios 314, 315, and 316 include one or more antennas and communicate wirelessly via one or more of the 2.4 GHz band, the 5 GHz band, the 6 GHz band, and the 6E GHz band, or at the appropriate band and bandwidth to implement any IEEE 802.11 Wi-Fi protocols, such as the Wi-Fi 4, 5, 6, or 6E protocols. Radios 314, 315, and 316 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

In this non-limiting example embodiment, radio 314 will operate in the 2.4 GHz band, radio 315 will operate in the 5 GHz band, and radio 316 will operate the 6 GHz band. All of the 2.4 GHz band, the 5 GHz band, and the 6 GHz band are non-limiting examples of bandwidths to be used with the present disclosure.

Interface 318 can include one or more connectors, such as RF connectors, or Ethernet connectors, and/or wireless communication circuitry, such as 5G circuitry and one or more antennas.

As shown in FIG. 3, gateway device 108 includes a controller 320; a memory 322; and at least one radio, a sample of which is illustrated as a radio 324, a radio 325, and a radio 326; and an interface 328.

In this example, controller 320, memory 322, radio 324, radio 325, radio 326 and interface 326 are illustrated as individual devices. However, in some embodiments, at least two of controller 320, memory 322, radio 324, radio 325, radio 326, and interface 326 may be combined as a unitary device. Further, in some embodiments, at least one of controller 320 and memory 322 may be implemented as a computer having tangible computer-readable media for carrying or having computer-executable instructions or data structures stored thereon.

Controller 320 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of gateway device 108 in accordance with the embodiments described in the present disclosure.

Memory 322 can store various programming, and user content, and data, including steering program 323.

Radios 324, 325, and 326, may include a Wi-Fi WLAN interface radio transceiver that is operable to communicate with router 106 and external server 110, as shown in FIG. 1. Radios 324, 325, and 326 includes one or more antennas and communicates wirelessly via one or more of the 2.4 GHz band, the 5 GHz band, the 6 GHz band, and the 6E GHz band, or at the appropriate band and bandwidth to implement any IEEE 802.11 Wi-Fi protocols, such as the Wi-Fi 4, 5, 6, or 6E protocols. Radios 324, 325, and 326 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

In this non-limiting example embodiment, radio 324 will operate in the 2.4 GHz band, radio 325 will operate in the 5 GHz band, and radio 326 will operate the 6 GHz band. All of the 2.4 GHz band, the 5 GHz band, and the 6 GHz band are non-limiting examples of bandwidths to be used with the present disclosure.

Interface 326 can include one or more connectors, such as RF connectors, or Ethernet connectors, and/or wireless communication circuitry, such as 5G circuitry and one or more antennas. Interface 326 receives data from external server 110 (as shown in FIG. 1) by known methods, non-limiting examples of which include terrestrial antenna, satellite dish, wired cable, DSL, optical fibers, or 5G as discussed above.

In operation, presume that user 102 has just purchased router 106 for residence 101. During the initial start-up of router 106, there will be no data from client device 104 for router 106 to analyze. Router 106 may find patterns in the battery usage of client device 104. Therefore, router 106, through known machine-learning technology, will collect data related to the use of client device 104 over time. The data related to the use of client device 104 over time will be termed a priori data, which may ultimately be used by router 106 to predict future use of client device 104. Non-limiting examples of data related to the use of client device 104 over time include battery level, received signal strength indicator (RSSI), client device entry and exit timings, client device idle time and duration, channel utilization, services used, bandwidths used with services, time of service, duration of service, and online transactions, from client device 106.

With reference to FIG. 3, controller 310 will execute instructions stored on memory 312 to allow router 106 to obtain data from client device 104 which will be stored in a history database within memory 312. The history database will contain multiple data types which allow router 106 to determine which band client device 104 should be connected. It should be noted that in some embodiments, controller 310 the history database may be stored in an external server, wherein controller 310 will have access to the history database in the external server.

The creation of the client device history database occurs during the initial setup. As user 102 had just purchased router 106, creates a history database for its connected devices, which in this example is client device 104. After the history database for client device 104 is created, router 106 will record the activity of client device 106 within the history database.

Router 106 will continue to update the history database as it obtains more data from client device 104.

Returning to FIG. 2, after the client device history is created/updated (S204), the client device battery is determined (S206). For example, controller 310 will execute instructions stored on memory 312 to allow router 106 to periodically collect the battery level of client device 104. In some embodiments, router 106 pulls battery level data from client device 104 using known protocols at predetermined time intervals. In other embodiments, client device 104 pushes battery level data to router 106 using known protocols at predetermined time intervals.

For purposes of discussion only, presume that router 106 determines that client device 104 is operating on a battery level of 70%. A non-limiting example of the amount of time between battery level checks may be 10 seconds.

Returning to FIG. 2, after the device battery is determined (S206), the upcoming event details are analyzed based on the client device history (S208). For example, presume that at 3:00, router 106 has obtained the battery level of client device 104 and found the battery level to be 70%. Returning to FIG. 3, controller 310 will execute instructions stored on memory 312 to allow router 106 to analyze the history of client device 104. Further, for purposes of discussion, presume that at 3:10, user 102 usually streams a movie. Router 106 will analyze the history database within memory 312, and determine that in approximately 10 minutes, user 102 will likely stream a movie on client device 104.

Returning to FIG. 2, after the upcoming event details are analyzed based on the client device history (S208), the battery level to complete the service is determined (S210). For example, presume that router 106 is predicting that user 102 will stream a movie on client device 104 at 3:10. As stated above, if client device 104 is operating at 70% battery power, router 106 must determine whether client device 104 will be able to stream a movie without running out of power from the battery.

Returning to FIG. 2, after the battery level to complete the service is determined (S210), it is determined whether the remaining battery is sufficient (S212). For example, presume that router 106 is aware that client device 104 is operating at 70% battery power. Further, presume that client device 104 is connected to the 6 GHz band of router 106, radio 316. Controller 310 will execute instructions stored on memory 312 to allow router 106 to further analyze the history database of client device 104 in order to calculate how much battery power is needed for client device 104 to stream the movie while connected to radio 316, i.e., operating a 6 GHz, which consumes much more power.

Returning to FIG. 2, if it is determined that the remaining battery is sufficient (Y at S212), then there is a predetermined waiting period (S214). For example, presume that router 106, after analyzing the history database of client device 104, has determined that the battery level required for client device 104 to stream a movie while connected to radio 316 is 60%. With client device 104 currently operating at 70% battery level, user 102 will be able to watch the movie in its entirety before client device powers off. Accordingly, just to be sure, in some embodiments, router 106 may wait for a predetermined time period, a non-limiting example of which being 10 seconds.

Returning to FIG. 2, after the predetermined waiting period (S214), the device history is updated (Return to S204). For example, as router 106 has determined that client device 104 is able to complete its task while connected to radio 316 at the current battery level, controller 310 will execute instructions stored on memory 312 to allow router 106 to update the history database with the new information gathered. Algorithm 200 then continues.

Returning to FIG. 2, alternatively, if it is determined that the remaining battery is not sufficient (N at S212), then the battery level required on other bands is calculated (S216). For example, presume that router 106, after analyzing the history database of client device 104, has determined that the battery level required for client device 104 to stream a movie while connected to radio 316 is 80%. With client device 104 currently operating at 70% battery level, user 102 will be unable to watch the movie in its entirety before client device powers off. Controller 310 will then execute instructions stored on memory 312 to allow router 106 to calculate the battery level required for client device 104 to stream the movie on other bandwidths, in this case being the 2.4 GHz band, radio 314 and the 5 GHz band, radio 315.

Returning to FIG. 2, after the battery level required on other bands is calculated (S216), it is determined if the battery level is sufficient on other frequencies (S218). For example, presume client device 104 is operating at 70% battery level, and needs 80% battery level to stream the movie. Controller 310 will execute instructions stored on memory 312 to allow router 106 to analyze the other available bands for client device 104 to connect.

The 6 GHz band may provide a better quality of service (QOS) than the 5 GHz band, but at a cost of consuming more power. Similarly, the 5 GHz band may provide a better QOS than the 2.4 GHz band, but at a cost of consuming more power. QOS may be objectively measured by many known parameters, a non-limiting example of which is the received signal strength indicator (RSSI), which is a measure of how well client device 104 can "hear" a signal from router 106. If the RSSI is low, the radio of the connected device will consume more power. The RSSI will decreases faster when connected to the 6 GHz band than when connected to the 5 GHz band and 2.4 GHz band due to the range difference. As such, steering a client device from the 6 GHz band to the 5 GHz band or 2.4 GHz band may lower the power consumption. For example, if client device 104 is connected to radio 316 operating in the 6 GHz band while at 70% battery level, steering client device 104 to radio 315 operating in the 5 GHz band or radio 314 operating in the 2.4 GHz band will allow client device 104 to deplete power from the battery at a lower rate.

Returning to FIG. 2, if it is determined that the battery level is sufficient on other frequencies (Y at S218), the client device is steered (S220). For example, presume that router 106 has analyzed the history database of client device 104 and found the required battery level to stream the movie on the 5 GHz band is 68%. As client device 104 is currently at 70%, user 104 would be able to stream the movie using client device 104. Controller 310 will execute instructions stored on memory 312 to allow router 106 to steer client device 104 from radio 316 to radio 314.

Another option would be steering client device 104 to the 2.4 GHz band. Presume that the required battery level of client device 104 to stream the movie on the 2.4 GHz band is 61%. Router 106 may then steer client device 104 to radio 314.

In some embodiments, the most suitable band may not be the 2.4 GHz band. While the 2.4 GHz band is the best for conserving battery level, it may not provide optimal QOS when compared to the 5 GHz band. The most suitable band will allow the client device to complete its task at its current battery level without sacrificing QOS. For example, presume that there are 3 bandwidths within residence 101: 6 GHz; 5 GHz; and 2.4 GHz. Further, presume that client device 104 is currently connected with the 6 GHz band. If router 106 determines that client device 104 has enough battery power to complete its task on both the 5 GHz and 2.4 GHz bands, but not the 6 GHz band, router 106 may steer client device 104 to the 5 GHz band, rather than the 2.4 GHz band.

In some further embodiments, router 106 may even steer client device 104 to a band where client device 104 will use more power. For example, presume that client device 104 is currently connected to the 2.4 GHz band. If client device 104 has enough battery power to operate while connected to the 5 GHz band, router 106 may steer client device 104 to the 5 GHz band.

Returning to FIG. 2, after the client device is steered (S220), there is a predetermined waiting period (S214). Then, the device history is updated (Return to S204).

Returning to FIG. 2, if it is determined that the battery level is not sufficient on other frequencies (N at S218), it is then determined if there the client device is in use (S222). For example, presume that router 106 has analyzed the history database of client device 104 and found the required battery level to stream the movie on the 5 GHz band is 76%, and the 2.4 GHz band is 72%. As client device 104 is currently at 70%, user 104 would not be able to stream the movie using client device 104. Controller 310 will then execute instructions stored on memory 312 to allow router 106 to determine if there is a mobile application running on client device 104.

Returning to FIG. 2, if it is determined that the client device is currently in use (Y at S222), the user is notified about the battery level (S224). This will be described in greater detail with reference to FIG. 4.

Figure 4:
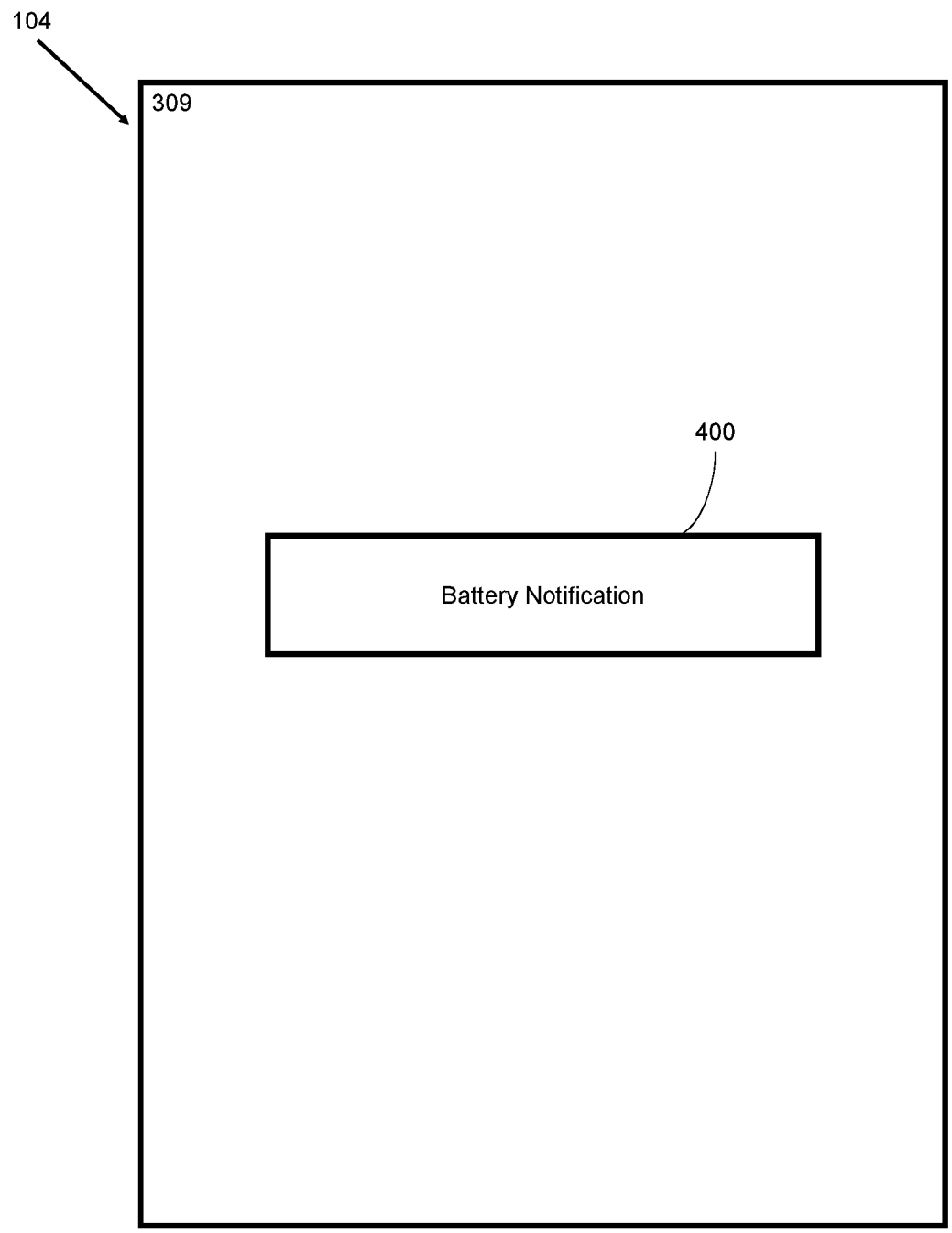
FIG. 4 illustrates a client device having a battery notification appearing on a GUI in accordance with aspects of the present disclosure.

FIG. 4 illustrates client device 104 having a battery notification 400 appearing on GUI 309 in accordance with aspects of the present disclosure.

For example, with reference to FIG. 4, presume that there is a mobile application running on client device 104. If there is an application running, it is likely that user 102 is currently using client device 104. In order to notify user 102, controller 310 will execute instructions stored on memory 312 to allow router 106 to send battery notification 400 to client device 104. Battery notification 400 will appear on GUI 309 of client device 104, alerting user 102 that client device 104 does not have sufficient battery to complete its task, a non-limiting example of which being streaming a movie.

Returning to FIG. 2, after the user is notified about the battery level (S224), the client device is steered to the 2.4 GHz band (S226). For example, once user 104 has been notified of the battery level of client device 104, controller 310 will execute instructions stored on memory 312 to allow router 106 to steer client device 104 to radio 314. Connecting to radio 314, or the 2.4 GHz band of router 106, will allow client device 104 to consume less power. User 102 has been notified of the low battery of client device 104, and will likely charge it in the near future. As client device 104 is now connected to radio 314, it gives user 102 more time to find a charger, as client device 104 will not be using as much battery power.

Returning to FIG. 2, after the client device is steered to the 2.4 GHz band (S226), there is a predetermined waiting period (S214). Then, the device history is updated (Return to S204).

Returning to FIG. 2, if it is determined that there is not a mobile app running on the client device (N at S222), then the client device is steered to the 2.4 GHz band (S226). For example, with reference to FIG. 4, if there is no application running on client device 104, user 102 may not be around to see battery notification 400. In this case, router will automatically steer client device 104 to radio 314 to allow client device 104 to consume less power.

In the non-limiting example embodiments discussed above if there is not a mobile app running on the client device (N at S222), then the client device is steered to the 2.4 GHz band (S226). However, in other embodiments, controller 310 may execute instructions in steering program 313 to cause router 106 to steer client device 104 to a less power consuming radio band during idle time. Controller 310 may execute instructions within steering program 313 to allow router 106 to predict the idle time using the a priori history data. As such, at any predicted idle time, router 106 may steer client device 104 to a less power consuming radio to save battery live of client device 104 during the idle time.

In some embodiments, there may be multiple access points in a household. For example, presume that, in addition to router 106, residence 101 also contained another access point, e.g. an extender. This additional access point may have additional bands for client device 104 to connect. Router 106 would also have the ability to steer client device 104 to bands associated with the second access point.

Client devices may end up using extra battery power unnecessarily depending on the bandwidth they are connected to. Using too much battery power will cause the client device to turn off while it is being used, leading to a bad user experience. There is a need for client devices to automatically be steered to the most optimal bandwidth to ensure quality service without sacrificing battery power.

In accordance with the present disclosure, a router is used within a home network. The router will obtain data from a connected client device and store it in a history database. The router will analyze the history database in order to predict upcoming events the client device will be used for. The router will determine what battery level is required for upcoming events to be completed on all bandwidths. The router will then steer the client device to the optimal bandwidth.

Thus, the present disclosure as disclosed steers client devices to their optimal bandwidths based on battery level of the client device.

The operations disclosed herein may constitute algorithms that can be affected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A network controller device for use with a first radio, a second radio, and a client device, the network controller device comprising:
   a first radio, wherein the first radio wirelessly communicates with the client device on a first band of the first radio;
   a second radio, wherein the second radio wirelessly communicates with the client device on a second band of the second radio;
   a memory having instructions stored thereon and a priori history data stored therein, the a priori history data corresponding to previous operations of the client device; and
   a processor configured to execute the instructions stored in the memory to cause the network controller device to:
      determine a current battery level of the client device while wirelessly communicating with the client device on the first band;
      obtain the a priori history data from the memory;
      determine a battery level required to complete a service on the first band based on the a priori history data; and
      steer the client device to the second band when the battery level is less than the current battery level.

2. The network controller device of claim 1, wherein the processor is configured to execute the instructions to additionally cause the network controller device to determine a second battery level required to complete the service on the second band based on the a priori history data.

3. The network controller device of claim 2, wherein the processor is configured to execute the instructions to additionally cause the network controller device to provide a battery level notification to the client device when the second battery level is less than the current battery level.

4. The network controller device of claim 2, further comprising:
   a third radio, wherein the third radio wirelessly communicates with the client device on a third band, wherein the processor is configured to execute the instructions to additionally cause the network controller device to steer the client device to the third band when the second battery level is less than the current battery level.

5. The network controller device of claim 1, wherein the processor is configured to execute the instructions to additional cause the network controller device to:
   obtain the a priori history data from an external server; and
   store the a priori history data in the memory.

6. The network controller device of claim 1, wherein the determining the battery level is based on analyzing upcoming event details of the client device based on the a priori history data.

7. The network controller device of claim 1, wherein the determining the current battery level comprises collecting the current battery level of the client device from the client device by pulling battery level data from the client device or by a push of the battery level data from the client device, wherein the determining the current battery level is based on the current battery level data.

8. A method of using a network controller device with a client device, the method comprising:
   storing a priori history data into a memory of the network controller device, the a priori history data corresponding to previous operations of the client device;
   determining a current battery level of the client device while wirelessly communicating with the client device on a first band of a first radio of the network controller device;
   obtaining the a priori history data from the memory;

determining a battery level required to complete a service on the first band based on the a priori history data; and steering the client device to a second band of a second radio of the network controller device when the battery level is less than the current battery level.

9. The method of claim 8, further comprising determining a second battery level required to complete the service on the second band based on the a priori history data.

10. The method of claim 9, further comprising providing a battery level notification to the client device when the second battery level is less than the current battery level.

11. The method of claim 9, further comprising steering the client device to a third band of a third radio of the network controller device when the second battery level required to complete the service on the second band based on the a priori history data is less than the current battery level.

12. A non-transitory, computer-readable media of a network controller device having computer-readable instructions stored thereon, the computer-readable instructions when executed by a processor of the network controller device cause the network controller device to perform one or more steps comprising:

store a priori history data into the memory, the a priori history data corresponding to previous operations of the client device;

determine a current battery level of a client device while wirelessly communicating with the client device on a first band of a first radio of the network controller device;

obtain the a priori history data from the memory;

determine a battery level required to complete a service on the first band based on the a priori history data; and steer the client device to a second band of a second radio of the network controller device when the battery level is less than the current battery level.

13. The non-transitory, computer-readable media claim 12, wherein the computer-readable instructions are capable of instructing the network controller device to perform the method further comprising determining, via the processor, a second battery level required to complete the service on the second band based on the a priori history data.

14. The non-transitory, computer-readable media claim 13, wherein the computer-readable instructions when executed by the processor further cause the network controller device to provide a battery level notification to the client device when the second battery level is less than the current battery level.

15. The non-transitory, computer-readable media claim 13, wherein the computer-readable instructions when executed by the processor further cause the network controller device to steer the client device to a third band of a third radio of the network controller device when the second battery level is less than the current battery level.

* * * * *